No. 786,479. PATENTED APR. 4, 1905.
L. BRANDAU.
COUPLING FOR RAILWAY VEHICLES.
APPLICATION FILED JAN. 7, 1905.
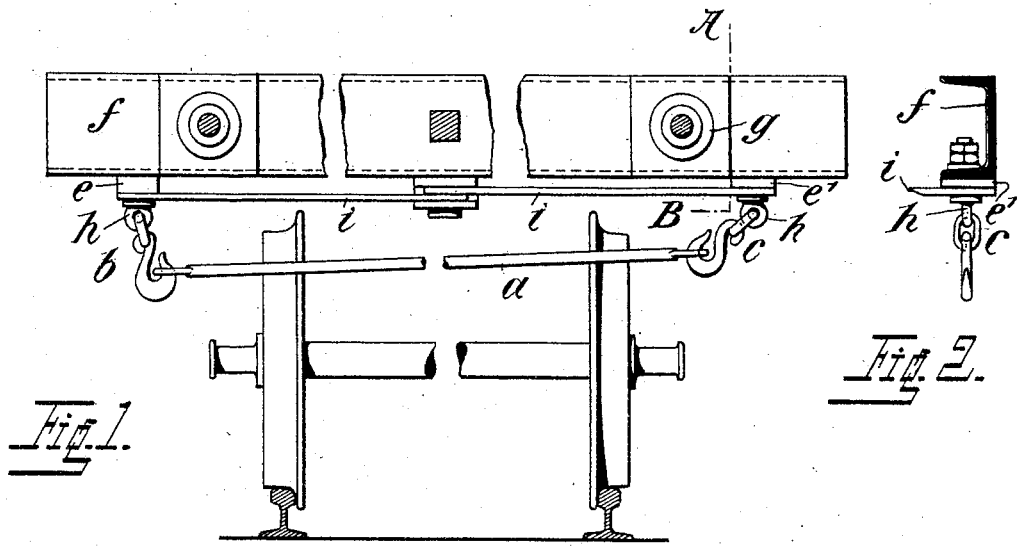
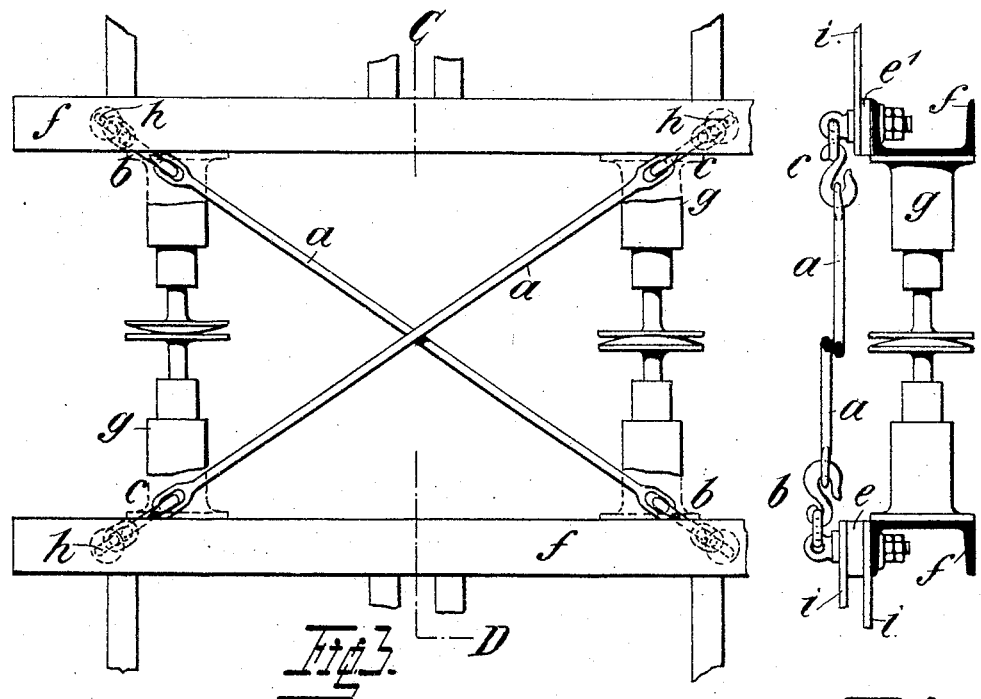
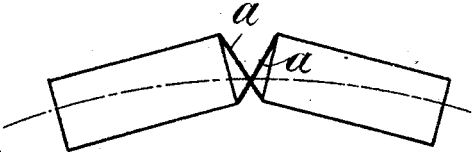
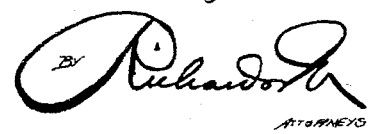

No. 786,479.

Patented April 4, 1905.

UNITED STATES PATENT OFFICE.

LUDWIG BRANDAU, OF CASSEL, GERMANY.

COUPLING FOR RAILWAY-VEHICLES.

SPECIFICATION forming part of Letters Patent No. 786,479, dated April 4, 1905.

Application filed January 7, 1905. Serial No. 240,121.

*To all whom it may concern:*

Be it known that I, LUDWIG BRANDAU, a subject of the King of Prussia, Emperor of Germany, residing at Cassel, Kingdom of Prussia, in the Empire of Germany, have invented a new and useful Coupling for Railway-Vehicles, of which the following is a specification.

My invention relates to improvements in couplings for railway-vehicles.

The necessity of passing the buffers and crossing the rails when attending to railway-couplings of the kind hitherto employed is, as is well known, exceedingly dangerous and has given rise to a large number of attempts to provide means whereby the couplings can be attended to from the side of the wagon. All the couplings proposed with this object in view are attended, however, with the defect of great complexity and defective safety when working.

The subject-matter of the present application is intended to be without these defects, these defects being avoided by the provision in a new manner of a crossed coupling which renders it possible in a very simple manner to couple and uncouple the separate vehicles of a railway-train from opposite sides or from any desired side of the rails.

One of the main features of the invention consists in the arrangement of a readily-detachable coupling-rod suspended, by means of chain-links or hooks, in such a way from each cross-beam or head-piece of a railway-vehicle that its variable useful length permits of the coupling of two vehicles when the rods are crossed and of the uncoupling of the same when the rods are placed in their parallel position.

The invention is elucidated by the figures of the accompanying drawings, in which—

Figure 1 illustrates the chief parts of the end of a vehicle with the one coupling-rod suspended parallel to the cross-beam. Fig. 2 is a cross-section of the cross-beam or head-piece on the line A B of Fig. 1. Fig. 3 shows in plan the coupling members in position coupling up the ends of two vehicles. Fig. 4 is a cross-section on the line C D of Fig. 3. Fig. 5 is a diagram of the automatic adjustment of the coupling members when passing round a curve.

According to the present invention each coupling-rod $a$ is arranged with its end eyes in the hooks of two draft-chains $b\ c$ on each head-piece $f$ of a vehicle. In order to couple up such a coupling, the head-pieces $f\ f$ of two vehicles must stand opposite one another, Fig. 3. If the opposite ends of the coupling-rods exchange places in the hooks of the pieces of draft-chain $b\ c$, this being effected from that side of the train which is selected, the wagons are coupled together, the rods lying crosswise, Fig. 3.

The draft-chains $b\ c$ serve for the necessary extension of the coupling-rods $a$ in the crossed position, Fig. 3, and for shortening the same in the released parallel arrangement, as in Figs. 1 and 2, and render it possible for the coupling to be attended to from any desired side of the train outside the buffers and rails. In the parallel arrangement, Fig. 1, the draft-chain $b$ is shown somewhat longer than the chain $c$, so that the coupling-rod $a$ hangs somewhat obliquely, the object of this being to enable the coupling-rod suspended between $b\ b$ when forming part of the crossed coupling, Fig. 3, to hang lower than the coupling-rod between $c\ c$, so that a grinding of the same one against the other during the running of the train is avoided. This can, for example, be brought about by intermediate pieces $e\ e'$ of various heights placed where the connection of the chain-links on the cross-beam $f$ of the vehicle is arranged.

The new coupling proves itself to be exceedingly good for passing round curves. It causes the wagons to be held always in the axis (both on curves and also on straight stretches,) and consequently the coupling forms a means for preventing the injurious swinging action or the like of the wagons. (See Fig. 5.)

If desired, the bolts of the eyes $h$ can be held more securely in their position and be consequently strengthened by rods $i$ or similar means which pass from one or more fixed points underneath the body of the carriage.

What I claim as my invention, and desire to secure by Letters Patent, is—

1. A coupling for railway-vehicles, consisting of two coupling-bars, and means for detachably attaching each bar at one end to one side of one vehicle, and at the other end to the other side of the other vehicle, substantially as described.

2. A coupling for railway-vehicles, consisting of two coupling-bars, and chains fixed near the sides on the vehicle ends and provided with hooks for detachably attaching each bar at one end to one side of one vehicle, and at the other end to the other side of the other vehicle, substantially as described.

3. A coupling for railway-vehicles, consisting of two coupling-bars, having eyes at each end, and chains fixed near the sides on the vehicle ends and provided with hooks for detachably attaching each bar at one end to one side of one vehicle, and at the other end, to the other side of the other vehicle, substantially as described.

4. A coupling for railway-vehicles, consisting of two coupling-bars, having eyes at each end, and chains fixed near the sides on the vehicle ends, and provided with hooks for detachably attaching each bar at one end to one side of one vehicle, and at the other end to the other side of the other vehicle, the chains of each diagonally opposite pair being equal in length, but the chains of one pair being longer than those of the other pair, whereby the bars when crossed lie horizontally one above the other, substantially as described.

5. A coupling for railway-vehicles, consisting of two coupling-bars having eyes at each end, and chains fixed near the sides on the vehicle ends and provided with hooks for detachably attaching each bar at one end to one side of one vehicle, and at the other end to the other side of the other vehicle, eyebolts for attaching the chains to the vehicle ends, and rods for aiding in securely holding said bolts, substantially as described.

In testimony whereof I have signed my name to this specification in the presence of two subscribing witnesses.

LUDWIG BRANDAU.

Witnesses:
  MAX FREUNDLISH,
  ALEXANDER STRANGE.